US006901066B1

(12) United States Patent

Helgeson

(10) Patent No.: US 6,901,066 B1
(45) Date of Patent: May 31, 2005

(54) WIRELESS CONTROL NETWORK WITH SCHEDULED TIME SLOTS

(75) Inventor: Michael A. Helgeson, Eagan, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/311,014

(22) Filed: May 13, 1999

(51) Int. Cl.[7] ................................................ H04B 7/212

(52) U.S. Cl. ........................ 370/348; 370/322; 340/539; 340/505; 340/3.22; 340/3.41; 455/343.3; 455/515; 455/507

(58) Field of Search ................................. 370/336, 337, 370/343, 345, 346, 347, 348, 412, 636, 322; 340/539, 870.01, 870.02, 870.03, 870.13, 870.14, 505, 3.21, 3.41; 455/343, 517, 507

(56) References Cited

U.S. PATENT DOCUMENTS

| | | | | |
|---|---|---|---|---|
| 3,643,183 A | | 2/1972 | Geffe | 333/80 R |
| 3,715,693 A | | 2/1973 | Fletcher et al. | 333/80 T |
| 3,758,885 A | | 9/1973 | Voorman et al. | 333/80 T |
| 4,264,874 A | | 4/1981 | Young | 330/277 |
| 4,529,947 A | | 7/1985 | Biard et al. | 330/259 |
| 4,812,785 A | | 3/1989 | Pauker | 331/117 FE |
| 5,392,003 A | | 2/1995 | Nag et al. | 330/254 |
| 5,430,409 A | | 7/1995 | Buck et al. | 330/2 |
| 5,451,898 A | | 9/1995 | Johnson | 327/563 |
| 5,481,259 A | * | 1/1996 | Bane | 340/505 X |
| 5,642,071 A | | 6/1997 | Sevenhans et al. | 327/359 |
| 5,726,603 A | | 3/1998 | Chawla et al. | 330/269 |
| 5,767,664 A | | 6/1998 | Price | 323/987 |
| 5,809,013 A | * | 9/1998 | Kackman | 340/636 |
| 5,847,623 A | | 12/1998 | Hadjichristos | 332/105 |
| 5,963,650 A | * | 10/1999 | Simionescu et al. | 340/870.02 |
| 6,175,860 B1 | * | 1/2001 | Gaucher | 455/3.01 X |
| 6,414,963 B1 | * | 7/2002 | Gemar | 370/412 |

FOREIGN PATENT DOCUMENTS

| | | |
|---|---|---|
| CH | 673184 A | 2/1990 |
| DE | 4344172 A | 6/1995 |
| EP | 0607562 A | 7/1994 |

OTHER PUBLICATIONS

Rofougaran et al., "A 900 MHz CMOS RF Power Amplifier with Programmable Output Power", *Proceedings VLSI Circuits Symposium,* Honolulu, Jun. 1994, pp. 133–134.

Rofougaran et al., "A 1 GHz CMOS RF Front–End IC for a Direct–Conversion Wireless Receiver", IEEE Journal of Solid–State Circuits, vol. 31, Jul. 1996, pp. 880–889.

(Continued)

*Primary Examiner*—Nay Maung
*Assistant Examiner*—Philip J. Sobutka
(74) *Attorney, Agent, or Firm*—Kris T. Fredrick

(57) ABSTRACT

A building monitoring system is disclosed that includes a bi-directional radio link between a master and a number of remote units, wherein the master unit schedules the transmission times of the remote units to avoid collisions.

34 Claims, 9 Drawing Sheets

OTHER PUBLICATIONS

Image–Rejection in Mixers, copyright AAA, 1996.

Wilson et al., "A Single–Chip VHF and UHF Receiver for Radio Paging", *IEEE Journal of Solid State Circuits,* vol. 26, No. 12, Dec. 1991, pp. 1945–1950.

Crols et al., "CMOS Wireless Transceiver Design", Kluwer Academic Publishers, 1997, pp. 17–23.

Chang et al., "A CMOS Channel–Select Filter for a Direct-Conversion Wireless Receiver", to appear in *IEEE Journal of Solid–State Circuits,* Apr. 1999.

Asad A. Abidi, "Direct–Conversion Radio Transceivers for Digital Communications", *IEEE Journal of Solid–State Circuits,* vol. 30, No. 12, Dec. 1995, pp. 1399–1410.

Behzad Razavi, "Design Considerations for Direct–Conversion Receivers", *IEEE Transactions on Circuits and Systems—II: Analog and Digital Signal Processing,* vol. 44, No. 6, Jun. 1997, pp. 428–435.

Thomas H. Lee, "The Design of CMOS Radio–Frequency Integrated Circuits", Cambridge University Press, 1998, pp. 344–351.

Product Specification for Advanced Pager Receiver UAA2082, Integrated Circuits, Jan. 16, 1996.

Moulding et al., "Gyrator Video Filter 1C with Automatic Tuning", *IEEE Journal of Solid–State Circuits,* vol. SC15, No. 6, Dec. 1980, pp. 963–968.

* cited by examiner

350

```
GET REMOTE UNIT INFO ~352
EXTRACT PERIOD AND DURATION ~354
DURATION = DURATION + MARGIN + REPLY ~356
FILL NODE WITH DATA FOR THIS REMOTE ~358
FOR ONCE THROUGH MAX PERIOD ~362
....ORIG_LOC = LOCATION ~364
....CREATE COPY OF NODE AS NODE_COPY ~366
....IF NO COLLISION AFTER LOOKAHEAD ~368
........MODIFY NEXTTIME IN NODE_COPY ~370
........LOOP ~372
............IF TIME AVAIL AT LOCATION ~374
................ADD NODE_COPY TO LOCATION ~376
................EXIT LOOP ~378
............ELSE
................INCREMENT LOCATION ~382
............ENDIF
........ENDLOOP
....ELSE (COLLISION PREDICTED) ~388
........ADJUST NEXTTIME UNTIL NO COLLISION ~390
....ENDIF
....LOCATION = ORIG_LOC + PERIOD ~394
ENDFOR
```

*Fig. 6*

Fig. 8
420
AA
422
ABAB
424
ABCDCDABCDCD
426
ABCDEFCDEFABCDEFCDEF
428
ABCADEABFADCABEADF

WIRELESS CONTROL NETWORK WITH SCHEDULED TIME SLOTS

CROSS REFERENCE TO CO-PENDING APPLICATIONS

The present application is related to U.S. patent application Ser. No. 09/311,242, filed May 13, 1999, entitled "Output Buffer With Independently Controllable Current Mirror Legs"; U.S. patent application Ser. No. 09/311,105, filed May 13, 1999, entitled "Differential Filter with Gyrator"; U.S. patent application Ser. No. 09/311,234, filed May 13, 1999, entitled "Compensation Mechanism For Compensating Bias Levels Of An Operation Circuit In Response To Supply Voltage Changes"; U.S. patent application Ser. No. 09/311,092, filed May 13, 1999, entitled "State Validation Using Bi-Directional Wireless Link"; U.S. patent application Ser. No. 09/311,250, filed May 13, 1999, entitled "Wireless System With Variable Learned-In Transmit Power"; and U.S. patent application Ser. No. 09/311,246, filed May 13, 1999, entitled "Filter With Controlled Offsets for Active Filter Selectivity and DC Offset Control", all of which are assigned to the assignee of the present invention and incorporated herein by reference.

FIELD OF THE INVENTION

The present invention relates generally to building monitoring and control for commercial and residential use. More specifically, the present invention relates to building monitoring and control systems including security, HVAC and other systems utilizing wireless, bi-directional radio frequency communication between master units and remote units. In particular, the present invention relates to remote units having scheduled transmissions coordinated so as to avoid collisions between scheduled transmissions.

BACKGROUND OF THE INVENTION

Building monitoring and control systems including security systems, HVAC and other monitoring and control systems are in increasing use in both commercial buildings and residential dwellings. For security systems, the increasing use is due in part to a long-term perception of increasing crime rates along with increasing awareness of the availability of building monitoring and security systems. For HVAC systems, the increasing use is due in part to the desire to reduce heating and cooling costs, and to save energy.

A building monitoring and/or control system typically includes a variety of remote units coupled to detection devices and at least one master unit which typically resides in a central location in the building and can include annunciation functions and reporting functions to another location such as a central reporting service or police department. Remote units have, in the past, been hard wired to the master unit. For example, in a security system, reed switches or Hall effect switches are often disposed near magnets located near doors and door jambs, with a door opening making or disrupting continuity, with the resulting signal being received by the master unit.

In hardwired systems the remote units and the detection devices may be nearly one in the same. For example, the detection device may be a foil trace on a glass pane and the remote unit may be wire terminals with optional signal conditioning equipment leading to a wire pair connected to the master unit. Hard wired units can be installed most easily in new construction, where running wire pairs is easier than in existing buildings. Installing hard-wired systems can be very expensive in existing buildings due in part to the labor costs of snaking wires through existing walls and ceilings. In particular, on a point-by-point basis, retrofitting residential dwellings can be expensive because houses are often not designed to be continually changed, as are many office buildings. For example, most houses do not have dropped ceilings and utility closets at regular intervals. Houses can have higher aesthetic expectations than commercial office buildings, requiring greater care in installing and concealing wiring.

Wireless security systems have become increasingly common. Existing systems use radio frequency transmission, often in the 400 MHz region. Wireless systems can greatly reduce the need for wiring between remote and master unit or units. In particular, wireless systems can communicate between the remote units and the master units without wiring. Remote units still require power to operate, and can require wiring to supply that power, which can add a requirement for power wiring where the power had been provided in hard wired systems over the wiring used to communicate between remote units and the master unit. The power requirement can partially negate the wireless advantage of radio frequency units, as some wiring is still required. The power supply wiring requirement is often eliminated with use of batteries. Battery life is largely a function of power consumption of the remote units. The power consumption is dependent upon both the electronics and upon the transmission duty cycle of the unit.

Current wireless systems typically utilize remote units that can only transmit and master units that can only receive. Remote units often transmit sensor data for needlessly long periods, and at higher power than is required, as there is no bi-directional capability, and therefore no way for the master unit to acknowledge receipt of the first remote unit message, or a low power message. Sometimes, the remote units transmit a health status message at regular periodic intervals. The health status message gives the health of the remote unit, sometimes includes sensor data, and informs the master unit that the remote unit is still functioning.

The periodic transmissions can be scheduled at the remote units by manually setting DIP switches or providing local programming to the remote units. However, the scheduling of the remote unit transmissions typically cannot be controlled or adjusted by the master unit because the communication between master and remote units is unidirectional. The master simply has no way to notify and change the timing of transmissions provided by the remote units. Since there is no coordination between the transmission times of the remote units, collisions can occur between remote unit transmissions, which may reduce the overall reliability of the system. To increase the probability that a particular remote unit transmission is received by the master, the remote unit may make the same transmission many times. However, this can significantly increase the power consumed by the remote units.

What would be desirable, therefore, is a bi-directional wireless monitoring and/or control system that has predetermined or periodic remote unit transmissions coordinated on a system wide basis so as to reduce or avoid collision between the scheduled transmissions. This may significantly increase the reliability of the system, and may reduce the power consumed by the remote units.

SUMMARY OF THE INVENTION

The present invention includes a building monitoring and control system that has bi-directional radio frequency links between master and remote units wherein the remote units preferably operate in a low power, non-transceiving state a majority of the time. The system may include at least one master unit and a plurality of remote units, the remote units being typically coupled to sensors for measuring or controlling security or building environment variables. The remote units in most systems can operate in a low power consumption state in which the unit can neither transmit nor receive, in a receive state in which the unit consumes more power and can receive transmissions from the master unit, and in a transmit state in which the unit consumes more power and can transmit messages to the master unit.

The master unit preferably includes a master scheduler for creating a master schedule that schedules the predetermined or periodic transmission times for all remote units. The master schedule may be a time ordered data structure formed of elements where each element includes a remote unit identifier, a transmit frequency to use, a time to expect transmission from the remote unit, and the next time the remote unit is to transmit a scheduled or predetermined time message. Generally, the master schedule may be a table, an array, an array having linked lists to the array of elements, a linked list or any other data structure. The master schedule is preferably populated with predetermined remote transmission times calculated such that the predetermined transmission times do not collide with one another. It is contemplated that the master schedule can be changed on the fly, for example, when the current system mode is changed. This may help keep the system configuration and system performance optimized.

The master schedule can be created in the master unit using information obtained from the remote units and from information provided in the master units, such as lookup tables containing information on attributes and properties of various remote unit types. In one method for obtaining information for creating a master schedule, information is obtained from remote unit transmissions and supplanted by additional queries and table lookups for the specific remote unit type found. Information that can be used to derive the master schedule includes the current system mode, the desired or target transmission period, the expected transmission duration, the desired safety margin, and the time allotted for a reply. In some embodiments, the expected transmission duration is assumed constant for all remote unit types.

The master schedule may also be created by obtaining the maximum period allowed for the system, obtaining a maximum allowed expected transmission duration, determining a maximum allowed interval based at least in part on the duration, dividing the maximum target period by the maximum interval to obtain the total number of elements, creating a data structure with that number of elements, beginning with one element, for each remote unit, filling an element having available time with a remote unit identifier, then skipping ahead about the time amount of the remote unit target period, and filling another element with a remote unit identifier, and repeating until the maximum period has been covered. Along with the remote identifier, the next time for the remote unit to transmit is preferably also written to the element. Other example methods and apparatus for creating a master schedule are described in the detailed description.

At run time, the master schedule can be traversed element by element to coordinate the predetermined transmission schedule of the remote units in the system. In one system, an element of a data structure for a remote unit expected transmission is visited at the time of the expected transmission until the transmission is received or until a timeout occurs. If the transmission is received, the message is acknowledged, optionally including the next time for the remote unit to transmit. If the transmission is not received within the timeout period, that fact can be noted and stored in the element and/or appropriate action can be taken. In either case, the next element in the time order is visited and the process is repeated. In some embodiments, the same time period is used by the remote unit until changed, with the timing of the acknowledge message serving as a synch signal.

In one process suitable for executing in a remote unit, the remote unit: determines a time for communication with a master; waits in a low power non-receive and non-transmit state for either a timer timeout or an event to occur; changes to a transmitting state upon detecting the event and transmits data to the master unit; changes to a transmitting state upon occurrence of the timeout and transmits data to the master unit; waits for acknowledgement from the master unit after transmitting data; and resumes the low power state. If acknowledgement is not received, in preferred embodiments, retransmission is performed, sometimes at a higher power level. In one process, timing information for the next transmission is received by the remote unit along with the acknowledgment. The acknowledgement can be used to re-synchronize the timer of the remote unit with the timer of the master unit. In one process, frequency information relating to the next transmission is received by the remote unit along with the acknowledgment. The new timer information and synch signal can be used to set the remote unit timer to generate the next timeout at the proper predetermined time.

As indicated above, it is contemplated that the master schedule may be changed on the fly to reconfigure the system. This may help optimize the system when the system changes mode. For example, the master schedule may increase the update rate for those temperature sensors that are located in a zone that is active, and may reduce the update rate for those temperature sensors that are in a zone that is inactive. The update rates, and the time slots assigned thereto, may thus be controlled in real time by the master schedule.

BRIEF DESCRIPTION OF THE DRAWINGS

FIG. 6 is a pseudo-code diagram of a process which can execute in a master unit for building a master schedule of remote unit predetermined transmissions;

DETAILED DESCRIPTION OF THE INVENTION

Figure 1:
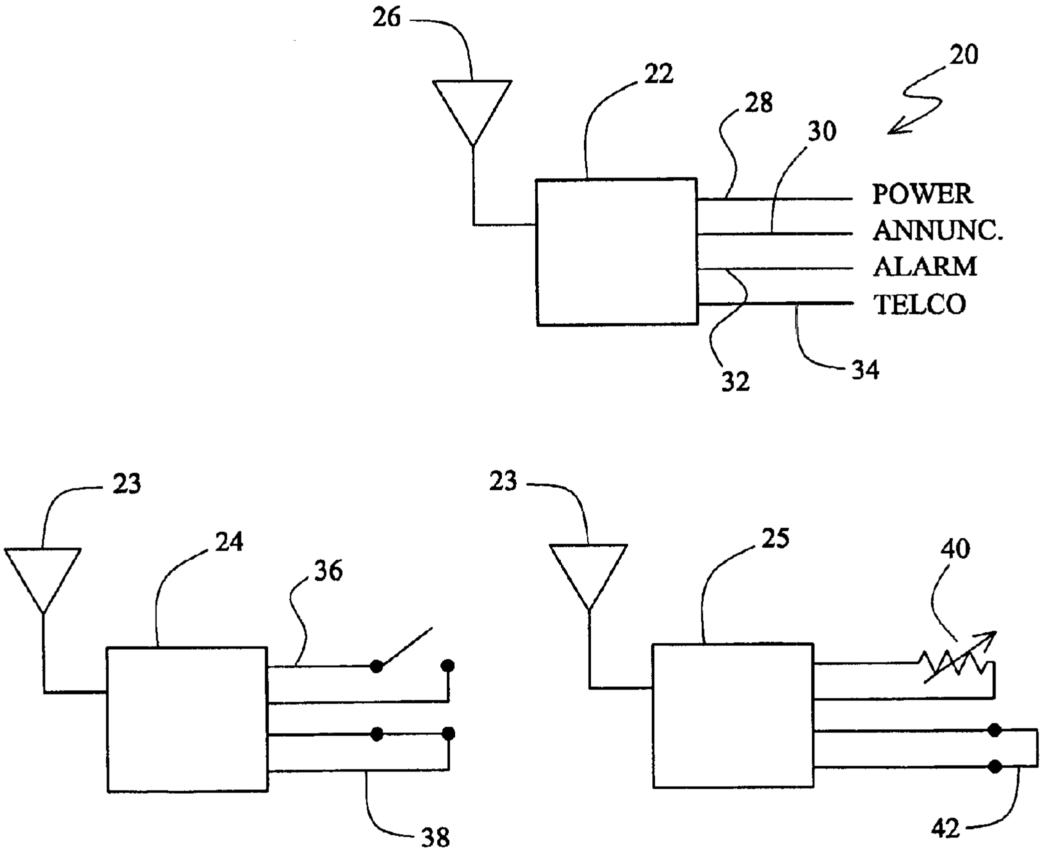
FIG. 1 is a block diagram of a wireless control system having a master unit and two remote units.

FIG. 1 illustrates a wireless control system 20 including a master unit 22 and two wireless remote units 24 and 25. Master unit 22 includes an antenna 26, a power supply line 28, annunciator panel output line 30, alarm device output line 32, and telephone line 34. A building monitoring and control system according to the present invention typically has at least one master unit which is commonly powered with AC line power but can be battery powered, or have battery back-up power. Remote unit 24 includes an antenna 23 and is coupled to two discrete sensor inputs 36 and 38. Sensor input 36 is a normally open sensor and sensor input 38 is a normally closed sensor. Sensors 36 and 38 can be reed switches or Hall effect devices coupled to magnets used to sense door and window opening and closing. Sensor 38 can be a foil continuity sensor used to detect glass breakage. Remote unit 25 includes antenna 23 and two analog sensors 40 and 42. Sensor 40 is a variable resistance device and security sensor 42 is a variable voltage device. Analog sensors can measure variables such as vibration, noise, temperature, movement, and pressure. Sensors typically sense or measure variables and output data. The data can be binary or discrete, meaning on/off. Data can also be continuous or analog, meaning having a range of values. Analog data can be converted to digital form by using an A/D converter.

Examples of sensors include intrusion sensors such as door switches, window switches, glass breakage detectors, and motion detectors. Safety sensors such as smoke detectors, carbon monoxide detectors, and carbon dioxide detectors are also examples of sensors suitable for use with the current invention. Other sensors include temperature sensors, water detectors, humidity sensors, light sensors, damper position sensors, valve position sensors, electrical contacts, BTU totalizer sensors, and water, air and steam pressure sensors. In addition to sensors, output devices can also be included with the present invention. Examples of output devices include valve actuators, damper actuators, blind positioners, heating controls, and sprinkler head controls. In one embodiment, remote devices having output capabilitity utilize circuitry identical or similar to the circuitry used for sensors, particularly for the communication and controller portions of the devices. Remote devices coupled to output devices typically are hard wired to power sources as they typically consume more power than the sensor input devices. For this reason, remote devices having output devices may not benefit as much from the power saving features of the present invention.

A building monitoring and/or control system according to the present invention can have a large number of remote units which can be spread over an area covered by the RF communication. One system can have remotes located about 5,000 feet (of free space) away from the master unit. The actual distance may be less due to intervening walls, floors and electromagnetic interference in general. Systems can have repeater units as well, units that receive and re-transmit messages to increase the area covered. In ome systems, repeaters have a receiver coupled to a transmitter by a long, hard-wired link, allowing separate areas to be covered by one master unit.

Figure 2:
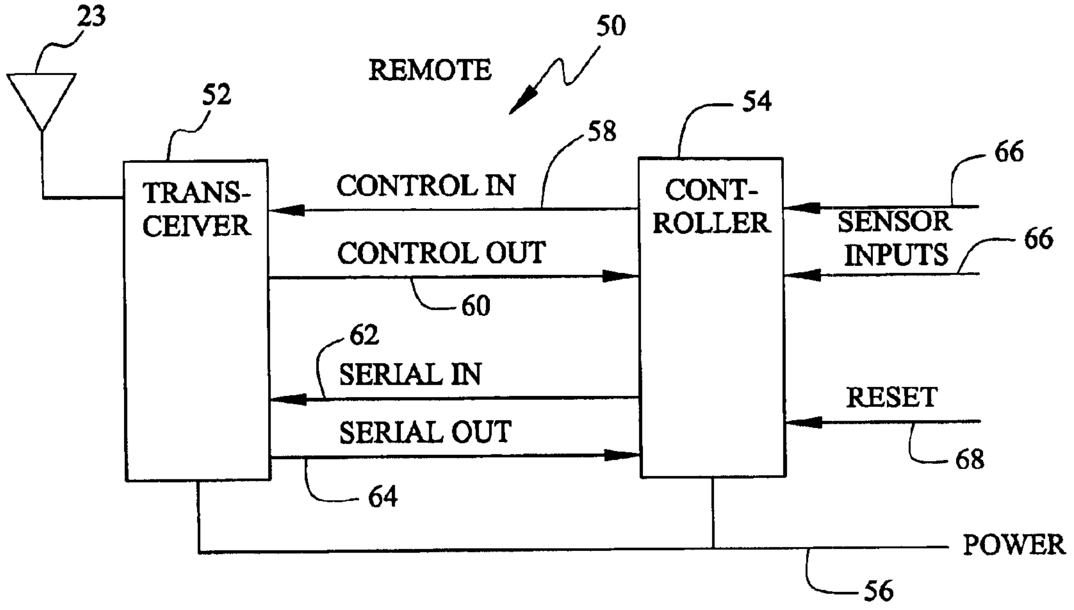
FIG. 2 is a block diagram of a wireless remote unit having a transceiver coupled to a controller.

Referring now to FIG. 2, a remote unit 50 is illustrated in further detail, including antenna 23, a transceiver 52, and a controller 54. Transceiver 52 and controller 54 are each coupled to power source 56 in the embodiment illustrated. Controller 54 includes a programmable microprocessor such as the PIC microprocessor in one embodiment. In another embodiment, the controller is formed primarily of a once-programmable or writeable state machine. Transceiver 52 is preferably a UHF transceiver, transmitting and receiving in the 400 or 900 MHz range. Transceiver 52 in one embodiment can be set to transmit and receive on different frequencies and to rapidly switch between frequencies. While transceiver 52 can include the capability to transmit and receive simultaneously, in a preferred embodiment, transceiver 52 can only either receive or transmit, but not both at the same time. In the embodiment illustrated, controller 54 is coupled to transceiver 52 with control input line 58, control output line 60, serial input line 62, and serial output line 64.

Control input line 58 can be used to reset the transceiver, to set modes, and to set transmit and receive frequencies. Control output line 60 can be used by signal controller 54 to determine when communication receptions or transmissions have been completed. Serial input line 62 can be used to feed messages to be transmitted to transceiver 52 as well as frequencies to be used and other control parameters. Serial output line 64 can be used to provide messages received from transceiver 52 to controller 54 and can be used to convey information about signal strength to controller 54. The controller and serial lines can, of course, be used for any purpose and the uses discussed are only a few examples of such uses in one embodiment. In some embodiments, the serial lines are used to convey both status and control data.

Remote unit 50 can also include sensor input lines 66 for coupling to security sensors and other devices. A reset line 68 can be coupled to a reset button to reset remote unit 50 when re-initialization of the unit is desired, such as at the time of installation or after battery changes. In some embodiments, battery power resumption serves as the reset function. A power line 56 is illustrated supplying both transceiver 52 and controller 54. In some embodiments, power is supplied directly to only the controller portion or the transceiver portion, with the controller portion supplied from the transceiver portion or visa versa. In the embodiment illustrated, controller 54 and transceiver 52 are shown separately for purposes of illustrating the present invention. In one embodiment, both controller 54 and transceiver 52 are included on the same chip, with a portion of the gates on board the chip dedicated for use as controller logic in general or used as a user programmable microprocessor in particular. In one embodiment, a PIC microprocessor is implemented on the same chip as the transceiver using CMOS logic and the PIC microprocessor is user programmable in an interpreted BASIC or JAVA language.

Figure 3:
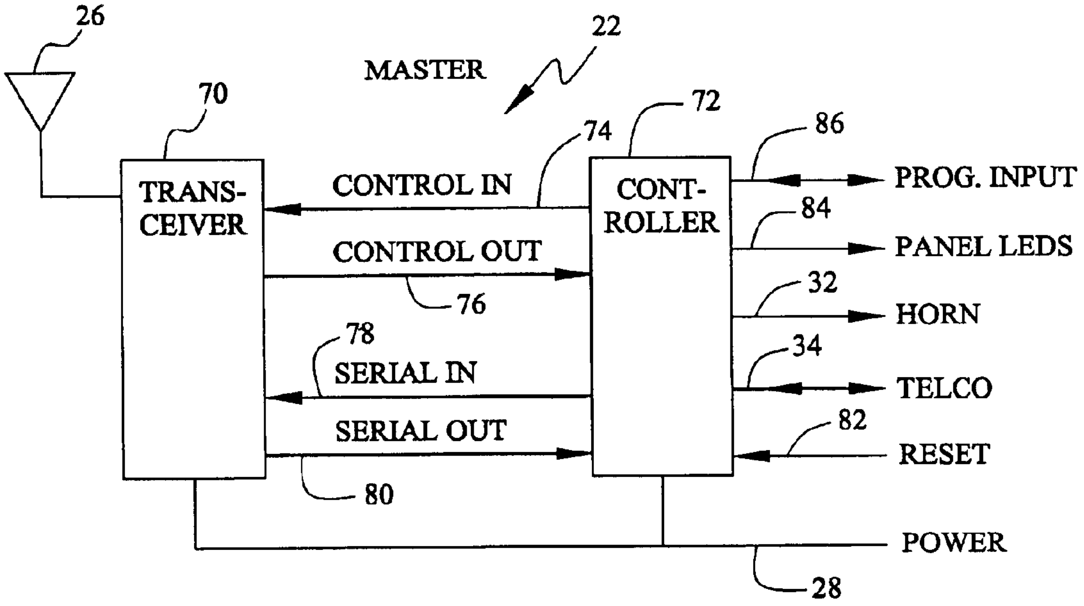
FIG. 3 is a block diagram of a master unit having a transceiver coupled to a controller.

Referring now to FIG. 3, master unit 22 is illustrated, including a transceiver portion 70 and a controller portion 72. Master unit 22 includes control lines 74 and 76 and serial lines 78 and 80. Reset line 82 is included in the embodiment illustrated as is a programmable input line 86, a panel LED output line 84, horn output line 32 and telephone line 34. Programmable input line 86 can be used for many purposes, including down loading control logic, inputting keyboard strokes, and inputting lines of BASIC or JAVA code to be interpreted and executed. Panel LED line 84 can be used to control panel-mounted LEDs giving status information. Horn line 32 can be used to activate alarm horns or lights. Telephone line 34 can be used for automatic dial out purposes to report security breaches to a reporting service or to the police.

In one embodiment, master unit 22 and remote unit 50 share a common chip containing the transceiver and controller logic. In one embodiment, the transceiver and controller are both on board the same chip used in the remote units, but the controller portion is supplanted, replaced, or augmented by additional programmable controller functionality such a personal computer. In many embodiments of the present invention, the master controller or controllers may require additional programmable functionality relative to the functionality required on the remote units.

In one embodiment of the present invention, the transceiver portion of the remote unit can operate in at least three modes. In one mode, the transceiver operates in a very low power "sleep" mode, wherein the transceiver is neither transmitting nor receiving. The transceiver can be awakened from the sleep mode by external control signals, such as provided by control lines coming from the control logic portion of the remote unit. In one embodiment of the invention, only the controller can change the state of the transceiver through the control lines such as control lines 58 and 60 in FIG. 2. In a preferred embodiment, at least three events can awaken the transceiver from the sleep mode. One event is the occurrence of a sensor data change, such as a door switch opening, or a significant percentage change of an analog variable. Another event is the lapse of a preset time interval, such as the lapse, of the time interval between scheduled health status transmissions by the remote, or between scheduled health status polls by the master unit for which the remote desires to be awake. Yet another event is the resetting of the remote, such as resetting of reset line 68 in FIG. 2.

In one embodiment, remote units can be configured or programmed to transmit sensor data only on a timeout occurrence or on a change occurrence. For example, a temperature sensor may be configured to transmit every half-hour or upon a one (1) degree change from the last transmission. This can greatly reduce power consumption.

In one embodiment, the controller portion of the remote unit can run in a low power mode, but is able to processes external signals and interrupts. In one embodiment, timing is handled by timers on board the chip housing the transceiver and controller. In this embodiment, the controller logic is able to process timing functions while in a low power mode. In another embodiment, timing is handled by circuitry external to the microprocessor, with the microprocessor being able to respond to interrupts but not being able to handle the timing functionality. In this embodiment, the timing can be handled by an RC timer or a crystal oscillator residing external to the microprocessor, allowing the microprocessor to lie in a very low power consumption mode while the external timing circuitry executes the timing functionality. In one embodiment, the timing and microprocessor circuitry both reside on the same chip, but can run in different power consumption modes at the same time. In one embodiment, the remote, not including timing circuitry, initializes in a normal power consumption mode, sleeps in a very low power consumption mode, which, when interrupted, executes in a normal power consumption mode while transmitting or receiving.

Figure 4:
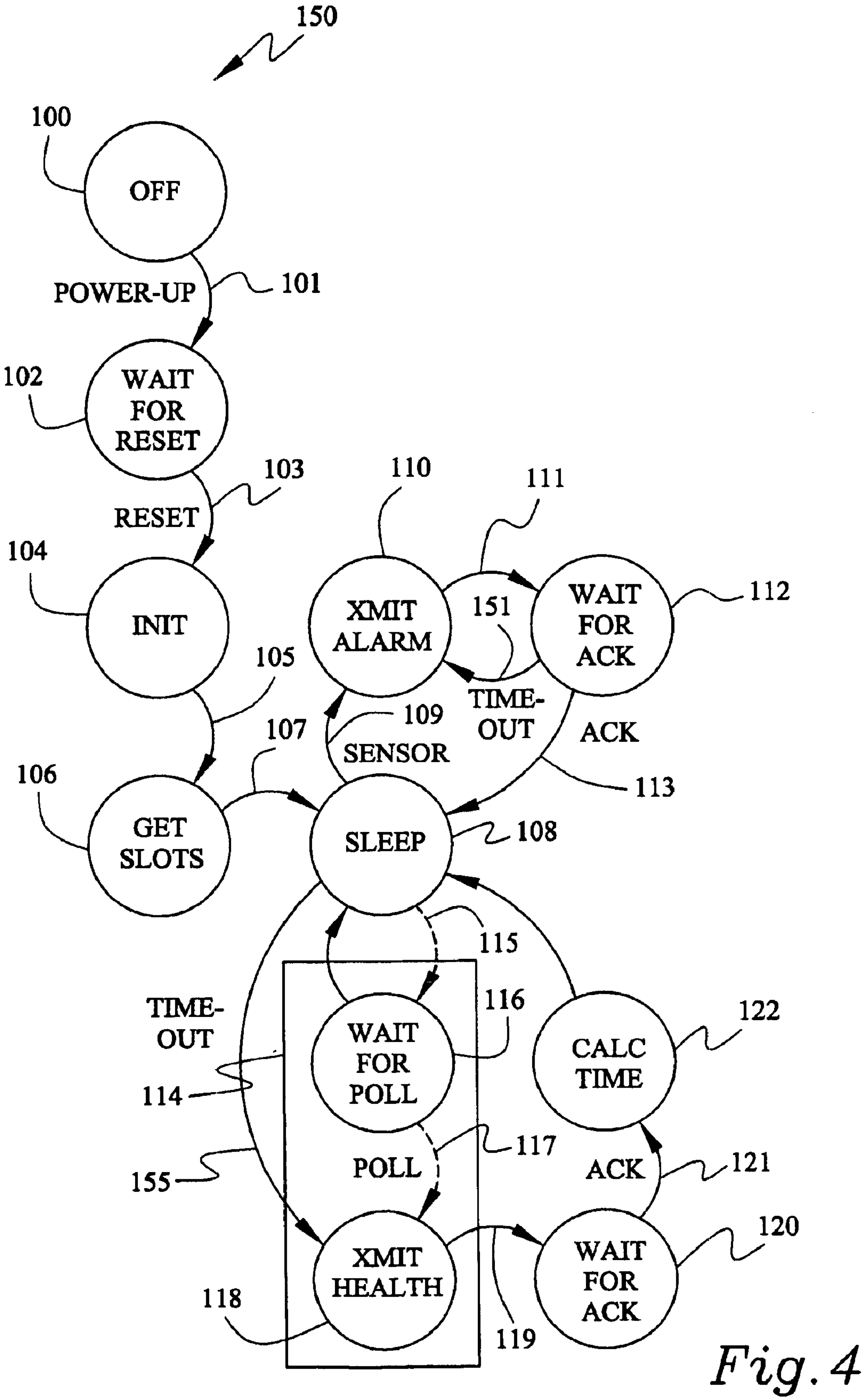
FIG. 4 is a state transition diagram of a process which can execute in a remote unit.

Referring now to FIG. 4, one method, process, or algorithm 150 according to the present invention is illustrated in a state transition diagram. Process 150 can be used for operating a remote unit such as remote unit 50 illustrated in FIG. 2. Process 150 can start with an OFF state 100, where the remote unit is powered down, for example with a dead or removed battery. Upon application of power, such as installation of a battery, a POWER-UP event 101 can be sensed by the microprocessor or external circuitry, causing a transition to a WAITING FOR RESET state 102. A reset button is installed in many remote units for the purpose of allowing re-initilization of the remote unit by the person installing the unit. In one embodiment, reset can also be accomplished via software, which can be useful if the remote ever becomes confused or has not heard from the master unit for a long time period utilizing a watchdog timer. A RESET event 103 can cause a transition to an INITIALIZING state 104. While in INITIALIZING state 104, typical initialization steps can be executed, such as performing diagnostics, clearing memory, initializing counters and timers, and initializing variables. Upon completion of initialization, indicated at 105, transition to a GETTING SLOTS state 106 can occur. GETTING SLOTS state 106 is discussed in greater detail below, and can include receiving a time slot for communication with the master and receiving frequency slots for transmitting to, and receiving from, the master. In one embodiment, the frequencies to utilize in the next transmission and the time remaining to the next transmission are determined or obtained by the remote unit in the GETTING SLOTS state. Upon completion of the GETTING SLOTS state, indicated at 107, the process transitions to a SLEEPING state 108.

SLEEPING state 108 is preferably a very low power consumption state in which the transceiver is able to neither transmit nor receive. In SLEEPING state 108, the controller circuitry or microprocessor is preferably in a very low power consumption state as well. While in SLEEPING state 108, the remote unit should be able to be awaken by timer interrupts or device sensor interrupts. In a preferred embodiment, the remote unit stays in SLEEPING state 108 indefinitely until awakened by an interrupt. Upon reception of a SENSOR event 109, a transition to a TRANSMITTING ALARM state 110 can occur. During this transition or soon thereafter, the transceiver can be switched to a transmit mode. While in this state, an alarm transmission is performed, for example, on the transmission frequency determined in GETTING SLOT state 106. While in this state, transmission of other status or security information can also be performed. For example, the remote unit can transmit the length of time a contact has been open or the current battery voltage. Upon completion of transmission, indicated at 111, a WAITING FOR ACKNOWLEDGE state 112 can be entered. While in this state, the transceiver can be switched to a receive mode at a receive frequency determined during GETTING SLOT state 106. While in this state, the remote is typically in a higher power consumption state relative to SLEEPING state 108.

Upon reception of an ACKNOWLEDGEMENT from the master unit, indicated at 113, the remote unit can enter SLEEPING state 108 again. If an acknowledge is not received within a TIMEOUT period, indicated at 151, the alarm can be transmitted again, in TRANSMITTING ALARM state 110. A number of re-transmissions can be attempted. The bi-directional nature of the remote units allows use of the acknowledgement function. The acknowledgement feature can remove the requirement of some current systems that the remote unit broadcast alarms at high power, repeatedly, and for long time periods. Current systems typically do not have remote units that know when their reported alarm has been received, thus requiring repeated transmissions and high power transmissions, even when a low powered, single alarm transmission by the remote could have been or had in fact been received.

SLEEPING state 108 can also be exited upon reception of a TIMEOUT event 115. In one embodiment, a timer is loaded with a time period determined during GETTING SLOT state 106. In one embodiment, a time to wait until transmitting status information, such as 300 seconds, is received from the master unit during GETTING SLOT state 106. The time to wait can either be used directly or adjusted with a margin of error to insure that the remote unit is not sleeping when the time period has elapsed. For example, a 360-second time to wait can be used in conjunction with a 5-second margin of error to awaken the remote unit for a receiving period from 355 seconds to 365 seconds. After reception of a TIMEOUT event 115, a status communicating step 114 can be executed, which can include setting the transceiver to either a transmit or a receive mode, discussed below.

In one embodiment, a WAITING FOR POLL state 116 can be entered, and the transceiver is set to a receive state at a receive frequency. In this embodiment, the remote does not transmit health status until polled by the master unit. The remote can remain in WAITING FOR POLL state 116 until time elapses, whereupon the remote unit can return to SLEEPING state 108 until the occurrence of the next time period has lapsed. In one method, a POLL REQUEST 117 is received from the master unit and the remote unit transitions to a TRANSMITTING HEALTH state 118. While in the TRANSMITTING HEALTH state 118 or soon before, the remote unit transceiver can be put into a transmit state at the desired frequency. In one embodiment, the poll request includes the desired transmit frequency to use. The health status and sensor data and sensor type of the remote unit can be transmitted. In one embodiment, a simple signal can be transmitted containing little information. In another embodiment, more information is included in the transmission. Information than can be transmitted includes remote unit ID, battery voltage, received master unit signal strength, and internal time. In some embodiments, sensor data is included in the TRANSMITTING HEALTH transmission. For example, in a room temperature sensor, the temperature can be transmitted as part of the health or status message. In this way, the periodic message used to insure that the remote unit is still functioning can also be used to log the current data from the sensors. In some embodiments, the data is too energy intensive to obtain and only remote unit health information is transmitted. After completion of the TRANSMITTING HEALTH state 118, indicated at 119, a WAITING FOR ACK state 120 can be executed. A WAITING FOR ACK state is executed in some embodiments to await an acknowledgement and/or a synch signal. A synch signal can be used to reset an internal timer to be used in determining the next time to awake from SLEEPING state 108. A synch signal can be used to prevent small remote unit timer inaccuracies from accumulating into large inaccuracies over time and allowing the remote unit timing to drift from the master unit timing. In some embodiments, an acknowledge signal received from the master unit is used to reset the time interval used by timeout event 109. In some embodiments, the acknowledge signal includes a new time and/or frequencies to be used by the remote unit for the next SLEEPING state and transmission and receiving state. In this way, the master unit can maintain close control over the next health transmission time and the next receiving and transmitting frequencies. After reception of the ACK or synch signal indicated at 121, a CALCULATING NEW TIME state 122 can be executed, for determining a new time to be used to determine the timing of event 115.

In one method according to the present invention, after expiration of a timer, a TIMEOUT event 155 occurs which can lead to execution of TRANSMITTING HEALTH state 118 rather than WAITING FOR POLL state 116. After occurrence of event 155, the remote unit can immediately transmit health data. In some embodiments, new transmission times, transmission frequencies, and flags indicating whether to wait for master unit polling are included in acknowledge or synch messages transmitted from master to remote.

Execution of TRANSMITTING HEALTH state 118 and subsequent steps are as previously described. In one embodiment, the decision of whether to generate TIMEOUT event 115 or 155 can be made in the remote, in response to a message received from the master. The process utilizing TIMEOUT event 155 is preferred. The process utilizing TIMEOUT event 115 is illustrated as an alternative embodiment suitable for some applications.

Remote units utilizing the present invention can thus remain asleep in a very low power consumption mode, neither receiving nor transmitting. One aspect of the present invention making this possible is the coordination of timing between master and remotes. Specifically, when the remote awakens and is able to receive over a window of time, the master should know the start time and time width of that time window to be able to transmit within that window if such a transmission is desirable. Specifically, when the master has allocated a time slot or window for receiving the health of a particular remote unit, that particular unit should transit its health within that time window in order to be heard. Coordination between master and remotes can include coordination of what frequencies to use, whether a transmission has been received, what time interval to transmit health data in, and when to begin transmitting the health data. This coordination is preferably obtained with communication between master and remote units. In particular, communication from master to remote can establish which frequencies to use, when to transmit health data, and whether the last transmission of a remote was received by the master. The fact that this data can be received by the remote means that the remote can react by changing to a different transmitting frequency, changing to a different transmitting power, changing to a different effective time interval or time interval start, and can re-transmit in the absence of an acknowledgment from the master unit. With the time windows for periodic transmission of health data established between remote and master, the remote can sleep in a very low power mode for a high percentage of the time, changing to a higher power mode only to transmit sensor changes and to periodically transmit health or sensor data.

In one embodiment, only the master unit is aware of the overall timing or scheduling scheme of the security system, with the remotes being aware only of the time until the start of the next scheduled remote unit TRANSMITTING HEALTH state or the time until the start of the next remote unit WAITING FOR POLL period. In this embodiment, the amount of processing power required in the remote is held down while only the master is aware of the overall scheduling of time slots.

Adding receivers to the remote units allows adjustment of frequencies in response to communication difficulties. In a typical building installation, remote units are installed near doors and windows and a master unit is installed, often in a central location. Over time, especially in a commercial building, furniture, walls, doors, and dividers are added, which can attenuate RF radiation transmitted through the building, between remote and master units. Reflections can also occur, causing Raleigh cancellation at certain frequencies, greatly reducing the effectiveness of communication at certain frequencies at certain locations, such as in corners. Using bi-directional communication between master and remote units allows adaptive selection of frequencies over time without requiring any work in the field with either master or remote units.

For a wireless building monitoring and control system to function it is important that the remote units be able to periodically transmit health data and/or sensor value data For example, it may be desirable to periodically have security sensors transmit the simple fact that they are still functioning. It may also be desirable to have temperature sensors periodically transmit room temperature. In a preferred embodiment, periodic measurements mean substantially regularly spaced time intervals, such as temperature measurements being sent every 5 minutes. In some embodiments, periodic measurements can be sent at varying intervals depending on the mode of operation. For example, temperatures might be sent more often during heat up periods such an early morning. Periodic transmissions can thus include transmissions made at predetermined times or time intervals where those time intervals are changing over time, but remain predetermined. This is in contrast to transmissions made in response to sensor value changes, such as intrusion detectors or rate of change detectors.

Two remote units transmitting at the same time talk over each other and can make each other's message unreadable to the receiving master unit. One way to deal with this problem includes using collision detection and retransmission protocols. Another way to deal with this problem includes using a master or global schedule to coordinate periodic transmissions such that collisions between periodic transmissions are avoided. One way to build a global or master schedule is to build a table or other data structure in the master unit and traverse that table or data structure at run time. The master unit can then receive transmissions from remote units at predetermined times or periodic intervals by having previously transmitted the next time to transmit to the remote unit, with the remote unit transmitting at that predetermined time. The master schedule should take into account the desired or target periods wanted for a given type of remote unit or sensor and can also take into account the estimated transmission duration. The master schedule should provide a coordinated set of remote unit transmission times that do not collide with each other.

Figure 5:
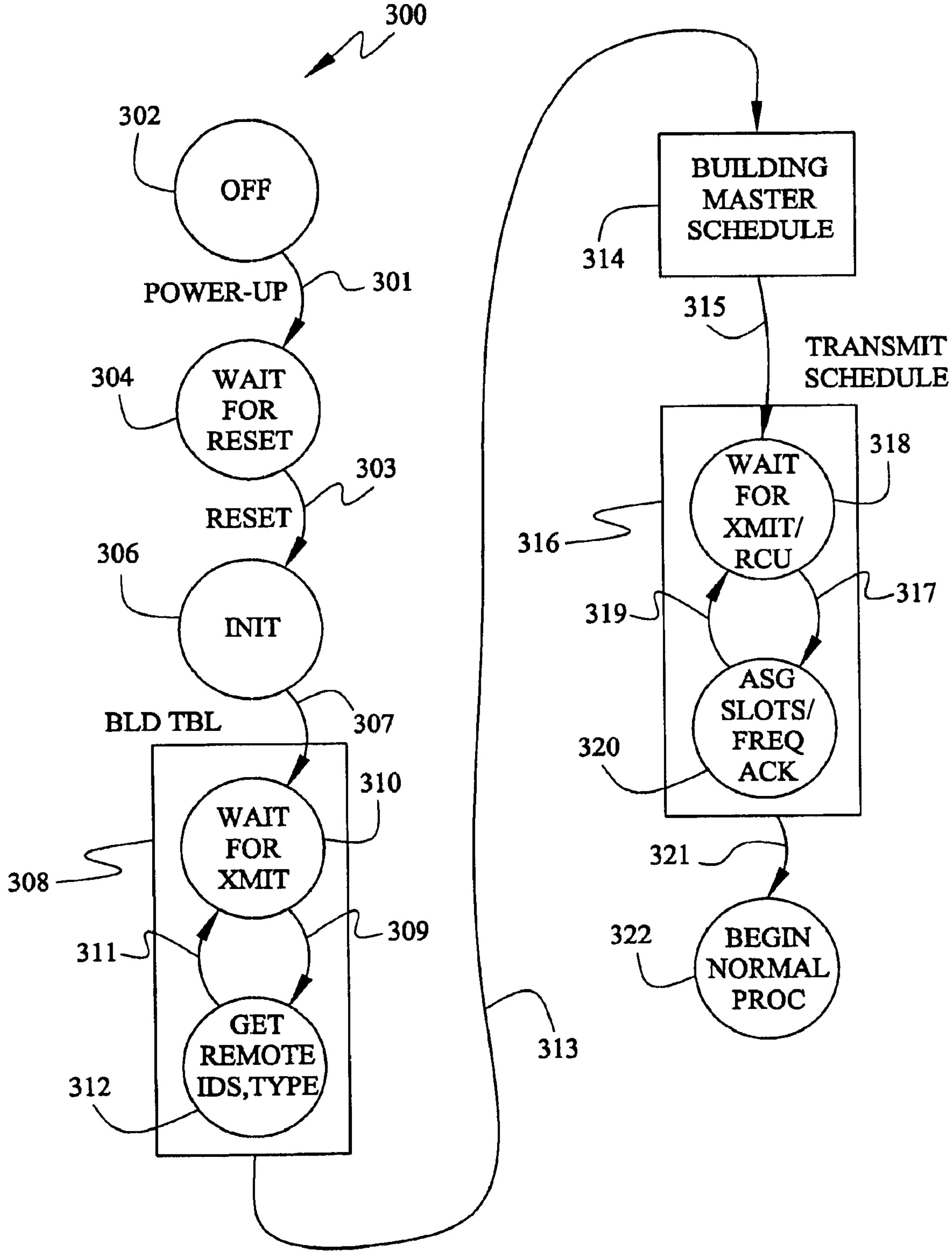
FIG. 5 is a high-level state transition diagram of a process which can execute in a master unit for building a master schedule of remote unit predetermined transmissions.

Referring now to FIG. 5, a process 300 for building a master table is illustrated. Process 300 can run in a master unit. Process 300 can begin in an OFF state 302 and progress to a WAITING FOR RESET state 304 upon sensing a POWER-UP event 301. Upon sensing a RESET event 303 an INITIALIZING state 306 is entered. A RESET event can be automatically generated upon application of power or can be a manually generated event to insure a controlled re-start after power failure. A RESET event can also be software generated to restart the system if the monitoring system becomes confused or out of synch between master unit and remote units. INITIALIZING state 306 can include system and program initializations including timer, variable, and memory initializations.

Upon completion of initialization indicated at 307, a BUILDING TABLE state 308 can be entered. BUILDING TABLE state 308 can include several sub-steps within. In one embodiment, the master unit does not request information from the remote unit but instead relies on the fact that the remote units are likely already transmitting a status or health message at some predetermined or periodic interval, and a remote unit ID including remote unit type, is included in the message. BUILDING TABLE state 308 illustrates such an embodiment.

In a WAITING FOR TRANSMISION state 310 the master unit transceiver is set to a receive mode at a default frequency and awaits reception of a transmission from a remote unit on that frequency. In one embodiment, the remote units, after having their periodic transmissions unacknowledged for some time, will switch to a default transmission frequency at a default power setting and at a default period. In one embodiment, this default period is the last period used, and for the first transmission sent after initialization, a default set in firmware can be used in place of the last transmission frequency. It should be kept in mind that the initialization of the master unit is preferably not a frequent occurrence, and that the total initialization of the master table is preferably not a frequent occurrence either. The addition of new remote units does not preferably require a total initialization of the master unit. In the case of the addition of a new remote unit, the installation procedure in some embodiments insures that the remote unit is fit into the master schedule at about the time of installation. In some embodiments, the new remote unit simply transmits at a default period and frequency which is listened for by the master unit. In some embodiments, the master unit has a second receiver mainly for detecting new or confused remote units coming on line at the default frequency. In some embodiments, the master unit, on a default master transmit frequency, periodically transmits the current master default receive frequency for the master unit. In some embodiments, a predetermined time in which the master unit will be listening on that frequency is included. The remote units which are new or confused can transmit at this frequency and/or time to begin the process of being fit into the master schedule.

Upon reception of a remote unit transmission, indicated at 309, a GETTING REMOTE IDS AND TYPES state 312 is executed. In one embodiment, a GETTING REMOTE IDS AND TYPES state includes retrieving the remote unit IDs and types from the periodic status message, and includes table lookup of other information, such as looking up sensor types based on remote unit IDs. In one embodiment, a GETTING REMOTE IDS AND TYPES state includes using a remote unit reception period following the received remote transmission to transmit a message from the master unit to the remote unit requesting information such as attached sensor types, remote unit ID, remote unit serial number, and other information that might not normally be transmitted at regular intervals. Thus, state 312 can include queries from the master unit and replies from the remote unit. In state 312, a table can be added containing the needed information for every remote unit heard from during the building table period. In one embodiment, the building table period is set by default to be the maximum period allowed for the devices, such as 60 minutes. In some embodiments, state 312 can include setting the next time to transmit for the remote unit to a desired value primarily for purposes of setting up a master schedule, discussed below. In some embodiments, the building table period can include the maximum allowed default period for the remote unit transmissions, as it may be assumed that the remote devices may have dropped into that mode when the master unit was not acknowledging the remote unit transmissions. Each unique remote unit ID and associated information can be placed into a data structure such as an array or linked list, with no duplicates present in a preferred embodiment.

After the remote unit information is added to the table in state 312, the master unit can return via event 311 to executing state 310 and waiting for another remote unit transmission. After a TIMEOUT event 313, a BUILD MAS- TER SCHEDULE state 314 can be entered. In one embodiment, the BUILD MASTER SCHEDULE state is integrated into the BUILD TABLE state, with the master schedule being built at the information is received from each remote unit. In the embodiment illustrated, the BUILD MASTER SCHEDULE state is separate, and executed after all information from the remote units has been received and placed into a table. In the BUILD MASTER SCHEDULE state, discussed in more detail below, a master schedule for coordinating the predetermined transmission or polling times for all remote units can be calculated and used to populate a data structure such as a linked list, an array, or an array with linked lists coming off the array elements. In one embodiment, the master schedule includes the remote unit ID, the transmit and receive frequencies it is to use, the target period for predetermined transmissions, the estimated transmission duration or interval, and the time for the remote unit to next transmit or wait for a poll.

Upon completion of building the MASTER SCHEDULE, indicated at 315, a TRANSMIT SCHEDULE state 316 can be executed. In TRANSMIT SCHEDULE state 316 the data calculated in the BUILDING MASTER SCHEDLE state can be disseminated to the remote units. In a WAITING FOR TRANSMISSION-RECEIVING state 318, the master unit waits for a scheduled time period during which a remote unit will be receiving, usually immediately after transmitting, hence the label WAITING FOR TRANSMISSION-RECEIVING. When the master unit believes the remote is receiving, indicated at 317, the portion of the schedule relevant to the remote unit can be transmitted in ASSIGNING SLOTS/FREQUENCIES state 320. In state 320, the frequencies to use as well as the next time to transmit can be transmitted to the remote unit. In one embodiment, the remote unit now has a flag set indicating it is operating as part of a master schedule. After completion of transmitting to the remote unit, indicated at 319, and preferably after acknowledgement, the label WAITING FOR TRANSMISSION-RECEIVING state can be executed, to wait for another remote unit time window to appear.

At some point, all remote units have been given their timing instructions or all remote units are regarded as having been given their timing instructions, as the time period allotted for disseminating the schedule information has expired. In either case, indicated at 321, a BEGIN NORMAL PROCESSING state 322 can be entered.

Referring now to FIG. 6, an example of the type of process that can be used to create the master is illustrated in a process 350. Process 350 is not intended to be a detailed specification but rather a high level illustration of a process type that can be used to create a master schedule for the present invention. Process 350 can be used either as part of a process that creates a master schedule incrementally, as data is received from remote units, or as part of a process that creates a master schedule after all known remote unit data has been received.

In step 352, information can be obtained about a remote unit, such as target period, estimated transmission duration, ID, remote unit type, software revision level, and sensor type or types. This information is obtained in some embodiments by querying the remote unit and by table lookup for that remote unit type in a master table. In particular, the target period and estimated transmission duration are desired, indicated at 254. In some embodiments, the estimated duration is fixed for all remote types and is also a function of transmission speed which is variable and can be set by the master unit.

In step 356, the DURATION or interval can be adjusted to include the estimated transmission duration safety margin, and any time allocated for receiving a reply from the master unit. For example, the duration allowed for a predetermined transmission and reply to a remote unit can be the estimated transmission duration time plus a 20% safety margin plus a time to allow for a transmission from the master unit to the remote unit after the remote unit transmission, as in some embodiments, the time following a remote unit transmission is the only time during which the remote unit is in higher power receiving state.

Process 350 is oriented toward creating a data structure such as an array having one element for each time interval, such as a second. In one embodiment, the array has a size corresponding to the maximum period allowed for the system, for example 300 elements for a 5-minute or 300-second maximum period. An array such as a sparse array can be implemented as a linked list to save space. Each array element can have a node or linked list of nodes hanging off the element, corresponding to nodes intended to be listened for during that second. The term "node" as used in this section, refers to a node to be inserted in this linked list. In step 358 a node can be filled with the data obtained about a remote unit, or can be partially filled and include a reference to a location containing information for each remote unit in a system. In many embodiments, the INTERVAL and estimated DURATION are copied into the node.

In step 362, the entire array is traversed, wrapping past the end if necessary, to populate the array with as many copies of nodes as required to fulfill the desired master schedule. In step 364, the previous array LOCATION is stored as ORIG_LOCATION, the purpose of which is explained below. The previous array location can be the last array location used, or the last location used plus an increment, or can be randomly generated. In step 366, a new copy of the node for this remote is created and initially can be filled with the contents of the node data from step 358. In particular, a NEXTTIME variable can be calculated, containing the next time the remote unit is to transmit, which can be communicated to the remote unit at run time. In some embodiments, a new node is created for every instance of a scheduled transmission by a remote unit.

In step 368, the array is checked by looking ahead to make sure that there will be no collision if the NEXTTIME variable is used as is. The NEXTTME variable should not be used as is if the remote unit will create a collision if it executes a transmission at the time directed by NEXTTIME. If no collision is predicted using this array location, the NEXTTIME variable can be written into the node as is, or modified as indicated at 370 to avoid a collision within a given second where there is still room within this second, for example later on during the second.

In step 372 a loop is begun to loop until an array LOCATION is found that has available time to receive the intended message from the remote. Obviously, the array locations for the time of intended reception and time of next expected reception are often linked by the predetermined time instruction sent to the remote unit in a message sent following the first reception. The availability of time at LOCATION can be checked at 374 by traversing the linked list at that location and totaling the times required within that second. If there is sufficient time, checked at 374, a node can be added to the linked list hanging off the array element for that second, at 376. It is understood that the exact time of the next transmission, NEXTTIME, can be effected by the exact time of the transmission of that NEXTIME, and some iterative collision prediction checking may be required before actually writing the NEXTTIME value to the node. After writing to the node and linking it to the array element, the loop can be exited at 378.

In the event there is not enough time available at LOCATION, LOCATION can be incremented at 382, and LOOP 372 executed again. In the event a collision is predicted by looking ahead in the array, indicated at 388, the NEXTTIME can be adjusted as indicated 390, until no collision is predicted. Once an array location has a node linked to that array element, LOCATION can be incremented by PERIOD to arrive at the next array element to attempt to use, allowing for wrapping around the array. After successful insertion of one remote unit into the master schedule, another remote unit can be inserted, until the master schedule is populated with all remote units in the system. Upon the addition of a new remote unit to the system, the newly added remote unit can be added in an analogous manner.

Modifications of the process illustrated in FIG. 6 are possible. In one example, instead of an array having small linked lists linked to each one second element, each element is divided into the maximum number of allowed transmissions for one second, for example 5, and the array is effectively transformed into an array having 200 millisecond array elements. The array can be implemented as a linked to list to deal with the sparseness of the array. This change can add simplicity but may come at the price of less flexibility if estimated transmission durations are to change from remote unit to remote unit. Another modification possible for process 350 is eliminating the array all together and forming a largely equivalent data structure formed of an order linked list having each node in time order in the linked list. This can reduce wasted array size but may increase search time. The linked list implementation can also allow for spreading out the remote unit periods or predetermined times, by adjusting, effectively adding to the periods for most or all remote units. This can effectively increase system capacity at the expense of longer remote transmission periods and is one way to deal with overloaded systems.

The master schedule is preferably effectively stored in an ordered data structure, including a node or element for each predetermined expected transmission period or available period for polling. At run time, the ordered data structure can be traversed, element by element, and/or node by node. As each node is reached, the predetermined transmission from the corresponding remote unit can be listened for and received. Upon reception, the message can be acknowledged and the next time for the remote to transmit can be transmitted to the remote unit along with the acknowledgment. If no change in the time until next transmission is desired, the same time previously used by the remote can be used again, with the timing of the acknowledge message serving as a synch signal. The next node in the data structure can then be retrieved and executed as well.

Initially, when a new remote unit is added, the unit may communicate at a default period and frequency. The master unit can communicate with the remote unit at that time, obtaining any needed period and duration information, then add the remote unit to the master schedule. Once added, the remote unit can be sent the proper next time to transmit and proper transmission frequency, to allow the next predetermined transmission from that remote unit fit into place in the master schedule. In a system where the master unit has come on line with little knowledge of what remotes are present, a process such as illustrated in FIG. 5 can be used to establish communication, if only in a default mode, until a master schedule can be created.

Figure 7:
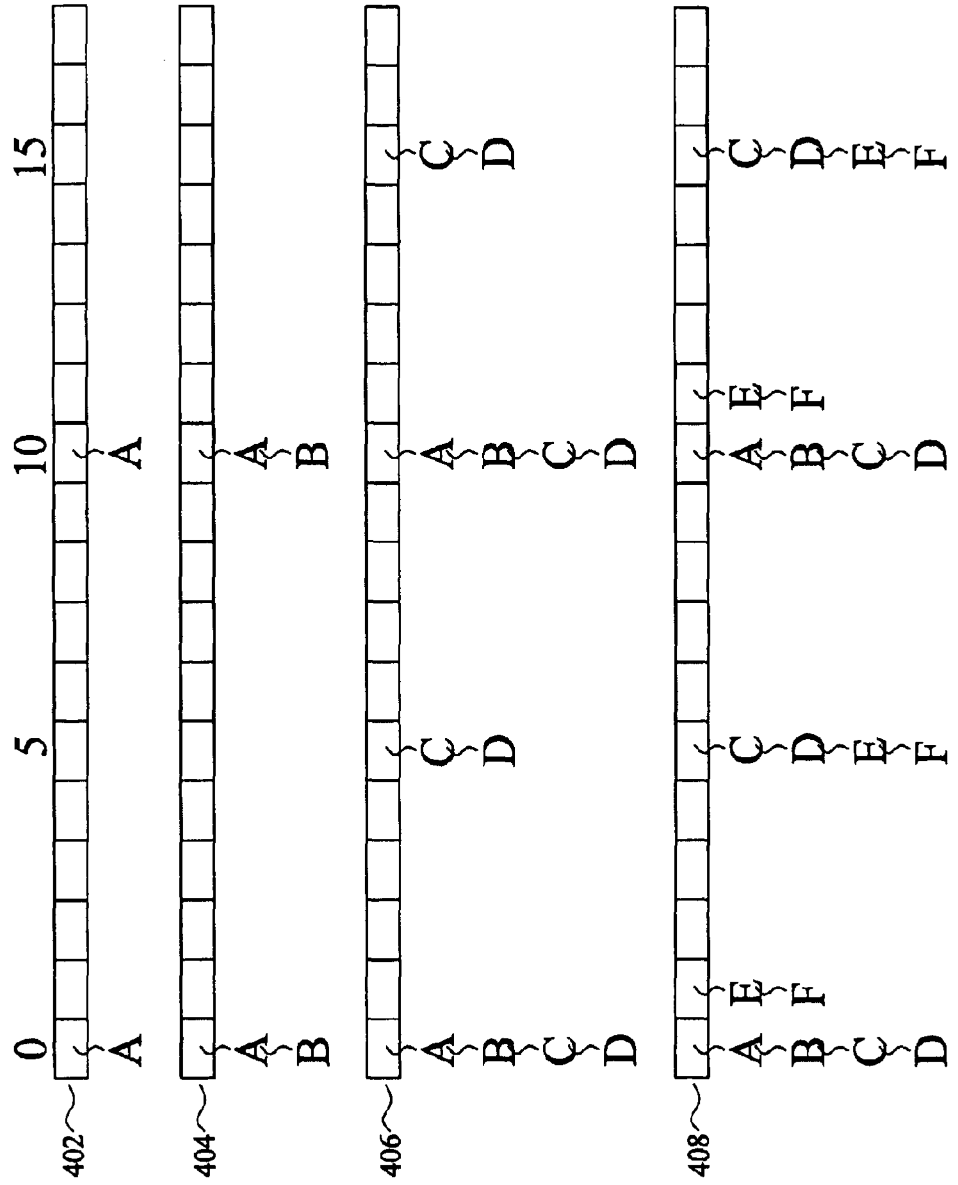
FIG. 7 is a diagram of a partial master schedule array after execution of four different steps, with the array having one node for each remote unit predetermined transmission, with each node being in a linked list linked to a one second element of the array.

Referring now to FIG. 7, a process for assigning time slots in a master schedule is illustrated. In this example, the time periods are low to simplify the illustration, and the array is shown only to 17 seconds. In this example, two remote units A and B have a target period of 10 seconds, and a long estimated transmission duration. Remote units C and D have a target period of 5 seconds and a medium estimate transmission duration. Remote units E and F have a target period of 5 seconds and a small estimated duration. In the process illustrated, the remote units are handled in decreasing order of estimate transmission duration, with the longest time requirements handled first. After step 402 execution, remote unit A is assigned to array elements for 0 second and 10 seconds. After step 404, remote unit B is also assigned array elements for 0 second and 10 seconds, being added to the linked list after A. After step 406, remote units C and D are added to array elements for 0, 5, 10, and 15 seconds. After step 406, only a negligible amount of time remains at 0 and 10 seconds for the transmission and reception of any data. After step 408, remote units E and F were added to array element locations for 1, 5, 11, and 15 seconds. 1 and 11 seconds were used rather than 0 and 10 seconds, as 0 and 10 were full with respect to time. Note that in this example, the next time to transmit would be different between 1 seconds and 5 seconds and between 5 seconds and 11 seconds, for the same remote units E and F.

Some observations can be made with respect to FIG. 7 and the process discussed in FIG. 6. In FIG. 7, remote units were said to be added in order of estimated transmission duration, but any ordering, including no order or the order of arrival of remote unit information could be used. After step 404, remote units A and B are seen to be bunched together at 0 second. In some embodiments this is not desired and a random placement for B would lead to a much smaller chance of bunching up. In some embodiments, the last array location used can be used along with an increment to start the next placement of a remote unit nodes in the array. In some embodiments, target transmission times are restricted or are forced fit to a subset of values, such as powers of some number, to simplify the master scheduling. For example, in one embodiment, target periods can only be 20, 40, 80, 160, 320, 640, and 1280 milliseconds. This can simplify the schedule building processes and the scheduling processes.

Figure 8:
FIG. 8 is a diagram of a partial linked list after execution of four different steps similar to the steps of FIG. 7, with the linked list having one node for each remote unit predetermined transmission, with each node being in a time ordered linked list.

Referring now to FIG. 8, a linked list example similar to FIG. 7 is illustrated. After step 420, the linked list has only remote unit A added. After step 422, remote unit B has been added. After step 424, remote units C and D have been added. After step 426, remote units E and F have been added. The nodes in the linked list such as A and B can contain information such as the next time to transmit and the frequency to transmit on. At run time, the linked list can be traversed, in time order, waiting at a node for the expected transmission from a remote unit, acknowledging that transmission and, in some embodiments, transmitting the next time to transmit to the remote unit.

Another link list is shown at 428. In this example, all remote units are queried at periodic (but different) intervals. In the example shown, remote unit A is assigned the first time slot, and every third time slot thereafter. Remote unit B is assigned the second time slot, and every six time slots thereafter. Remote unit C is assigned the third time slot, and every nine time slots thereafter. This illustrates how some remote units can be queried more often than others, while maintaining periodic query intervals for all remote units.

Figure 9:
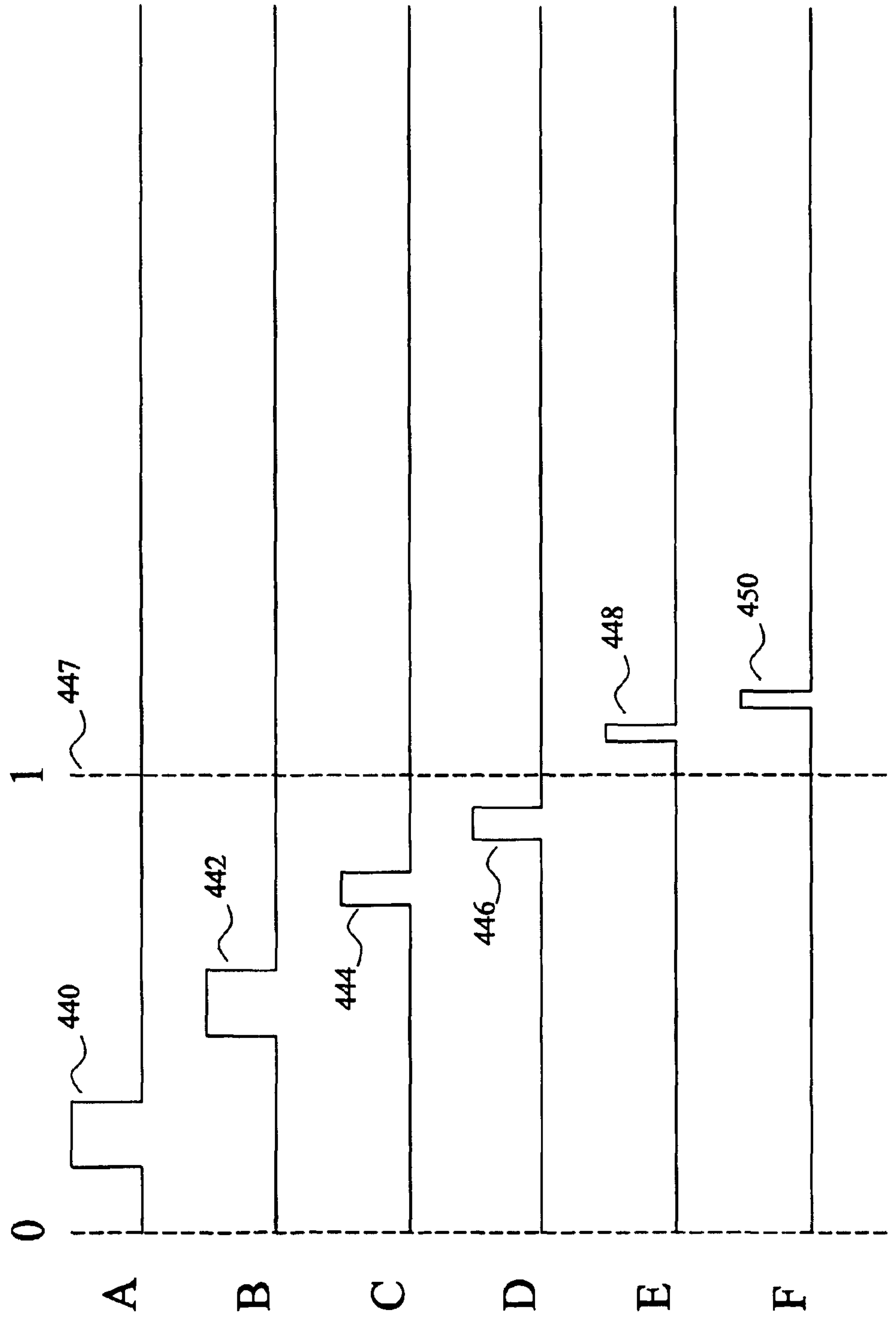
FIG. 9 is a partial timing diagram corresponding to executing the master schedule of FIG. 7 or 8, illustrating the lack of collisions between predetermined transmissions.

Referring now to FIG. 9, a timing diagram corresponding to FIG. 7 is illustrated. The rise and fall indicated corresponds to the start and end of a transmission by a remote unit. In the embodiment illustrated, there are no collisions between the scheduled remote unit transmissions. As can be seen, remote unit A has a transmission 440 which ends prior to a transmission 442 from remote unit B. Remote units C and D follow with transmissions 444 and 446. At 1 second, indicated at 447, available transmission time has been used up for that second, and remote units E and F transmit within the next second slot, indicated at 448 and 450. The length spacing between transmissions, such as between 440 and 442, can reflect a safety margin, or a time left to allow including a lengthy reply along with the acknowledging transmission by the master unit.

In addition to the advantages discussed above, for those applications where there are close independent controllable spaces such as in an apartment building, the present invention may reduce the possibility of collisions between remote unit transmissions. Since the master is always listening, the master can identify foreign transmissions that originate from remote units in another apartment. By identifying these foreign transmissions, the master can re-calculate a schedule for its own remote units that helps avoid conflicts with the foreign transmissions. This can significantly increase the reliability of the system.

Having thus described the preferred embodiments of the present invention, those of skill in the art will readily appreciate that the teachings found herein may be applied to yet other embodiments within the scope of the claims hereto attached.

What is claimed is:

1. A building monitoring system utilizing bi-directional radio frequency communication comprising:

at least one master unit including a radio frequency transmitter and receiver;

a plurality of remote units having a radio frequency transmitter and receiver, said remote units capable of transmitting to and receiving from said master unit; and said master unit includes a master scheduler that provides non-colliding predetermined remote transmission times for each of said remote units, wherein there is greater than 1 second between scheduled remote transmission times for at least some of the selected remote units, said remote units have a timer coupled to a controller for enabling said remote units to communicate at said predetermined remote transmission times with said master unit.

2. A building monitoring system according to claim 1, wherein said remote units include:

a radio frequency transceiver capable of receiving from and transmitting to said master unit;

a controller coupled to said transceiver for controlling said transceiver; and at least one sensor coupled to said controller.

3. A building monitoring system according to claim 2, wherein each of said remote units transmit a message to said master unit at a predetermined transmission time, said predetermined transmission time being determined by said master scheduler and transmitted to said corresponding remote unit, said scheduler coordinating each predetermined transmission time so as to avoid collisions between predetermined transmissions times of other remote units.

4. A building monitoring system according to claim 3, wherein said predetermined transmission times are transmitted from said master unit to said remote units as absolute times.

5. A building monitoring system according to claim 3, wherein said predetermined transmission times are transmitted from said master unit to said remote units as time delays.

6. A building monitoring system according to claim 3, wherein said remote units have a target transmission period and an estimated transmission duration, said master unit spacing said predetermined transmission times by at least said estimated transmission durations to avoid collisions.

7. A building monitoring system according to claim 6, wherein said remote units have remote unit types and said estimated transmission durations depend on said remote unit type, said master schedule being calculated as a function of said estimated transmission durations.

8. A building monitoring system according to claim 1, wherein said remote units having a first low power consumption state in which said remote units can neither receive nor transmit, a second power consumption state in which said units can receive, and a third power consumption state in which said units can transmit, said remote units arm in said receive state only at predetermined intervals, wherein said second and third sates have higher power consumption than said first state, and wherein at least some of said remote units include sensors logically coupled to said remote units.

9. A bi-directional building monitoring system comprising:

at least one master unit including means for wireless transmission and reception of data;

a plurality of remote units, wherein each of said remote units include means for wireless transmission of data to said master unit and means for wireless reception of data from said master unit, said remote units fiber include means for sensing external conditions and generating external sensor data;

means for calculating a schedule of periodic transmissions from said remote units to said master unit, wherein there is greater than 1 second between periodic transmissions for at least some of the selected remote units;

wherein said means for transmitting from said master unit to said remote units includes means for transmitting at least part of said schedule to said remote units; and timing means in said remote units for enabling said remote units to transmit said external sensor data to said master unit in accordance with said schedule.

10. A method for allowing a remote unit to communicate with a master unit in a building monitoring system that has at least one master unit including a radio frequency transmitter and receiver, and a plurality of remote units having a radio frequency transmitter and receiver, said remote units capable of transmitting to and receiving messages from said master unit, the method comprising:

determining a remote unit transmission time for each remote unit to communicate with said master unit such that each of said remote unit times do not collide with each other, wherein there is greater than 1 second between remote unit transmission times for at least some of the remote units;

b. transmitting each remote unit time to a corresponding remote unit;

c. detecting when the remote unit transmission time arrives for each remote unit; and d. communication a message between a corresponding remote unit and said master unit when each remote unit transmission time is detected.

11. A method according to claim 10, wherein each of said remote units have a non-communicating low power consumption state in which said remote units can neither receive nor transmit, a receiving state in which said units can receive, a transmit state in which said units can transmit, said receiving and transmitting states having higher power consumption than said non-communicating state.

12. A method for scheduling remote unit radio frequency message transmissions in a building monitoring system, the method comprising:

a. providing at least one master unit including a radio frequency transceiver, and a controller for operating said receiver;

b. providing a plurality of remote units, wherein said remote units include a radio frequency transceiver capable of transmitting to said master unit transceiver and capable of receiving from said master unit transceiver, wherein said remote units have a target transmission period for transmitting a complete message to the master unit;

c. providing means in said mater unit for calculating a mater schedule of predetermined remote unit transmission times for said remote its, wherein said predetermined remote unit transmission times are based at least in part on said remote unit target transmission periods, such that collisions are avoided between said predetermined transmissions;

d. calculating said master schedule of predetermined remote unit mission times based at least in part on said remote unit target transmission periods;

e. transmitting timing instruction based on said master schedule from said master unit to said remote units; and transmitting messages from said remote units to said master unit at times based on said timing instructions.

13. A method as recited in claim 12, wherein said mean for calculating includes a computer executing a program allocating said predetermined transmissions times to a plurality of time slots for said remote unit predetermined transmission times, wherein said time slots are stored in said schedule.

14. A method as recited in claim 12, wherein said remote units have an estimated transmission duration, wherein said schedule of predetermined times insures that, for each of said remote units, each of said predetermined remote unit transmission times have a start time wherein said start times are spaced apart by at least said remote unit estimated transmission durations.

15. A method as recited in claim 12, wherein said remote units have are classified into types and said estimated transmission durations are a function of said remote unit types, wherein said calculating schedule step includes determining said estimated transmission duration as a function of said type.

16. A method as recited in claim 12, wherein said remote units are classified into types and said remote unit target transmission periods are a function of said remote unit types, wherein said calculating schedule step includes determining said remote unit target transmission periods as a function of said type.

17. A method a recited in claim 12, wherein said remote units are coupled to sensors wherein said sensors are classified into types and said estimated transmission durations are a function of said sensor types, wherein said calculating schedule step includes determining said estimated transmission duration as a function of said sensor type.

18. A method as recited in claim 12, wherein said remote units are coupled to sensors wherein said sensors are classified into types and said remote unit target transmission periods are a function of said sensor types, wherein said calculating schedule step includes determining said remote unit target transmission as a function of said type.

19. A method as recited in claim 12, wherein said means for calculating includes an executable computer program including the steps of, deriving said remote unit target periods from data obtained from said remote units;

setting a maximum target period;

determining a maximum remote unit transmission duration;

dividing said maximum target period by said maximum target duration to obtain the number of elements to allocate;

create a data structure with at least said number of elements; and beginning with one element, for each remote unit, filling a bucket having available time with a remote unit identifier, then skipping ahead about the time of the remote unite target period, and filling another element with said remote unit identifier, repeating until the maximum target period has been covered.

20. A method as recited in claim 19, wherein said maximum target period is the largest target period obtained from said remote units.

21. A method as recited in claim 19, wherein said maximum target period is the largest target period obtained from said remote units clamped at a maximum value.

22. A method as recited in claim 19, wherein said remote units are classified into types and said remote unit target periods are obtained indirectly from said remote units by obtaining said remote unit types from said remote units and said remote unit target periods are derived from said remote unit types.

23. A method for as recited in claim 19, wherein said means for calculating includes an executable computer program including:

obtaining said remote unit target periods from said remote units;

setting a global maximum target period;

for each remote unit, calculating the number of predetermined transmissions that will occur within the global maximum target period;

for all remote units together, calculating the global number of predetermined transmissions that will occur within the global maximum target period;

creating an ordered data structure having a number of elements at least equal to said global number of predetermined transmissions; and for each remote unit, for each of said number of predetermined transmissions for said remote unit filling in one of said elements in said data structure with data including an identifier for said remote unit and a predetermined time for that remote unit to next transmit.

24. A method as recited in claim 23, where said data structure includes a linked list of at least one element for each predetermined remote unit transmission time, wherein said linked list is sorted according to time of predetermined transmission.

25. A method as recited in claim 23, wherein each of said remote units has an estimated maximum remote unit transmission period, wherein an estimated end of transmission is calculated based at least in part on said predetermined transmission time and said estimated transmission duration, wherein and said data structure element contained predetermined next transmit time does not occur not before said estimate end of transmission time.-

26. A method as recited in claim 23, wherein said computer program, in execution, traverses said elements of said data structure in time order, and for each element, transmits said next predetermined remote unit transmission time to id remote unit for said element.

27. A method for operating a bi-directional radio frequency building monitoring system master unit including at least one master unit having a controller coupled to a transceiver, aid a plurality of remote units each having a transceiver, the master unit having a computer processor and a time ordered data structure including a plurality of elements, said data structure elements having predetermined transmission times including at least one predetermined transmission time for each of said remote units having predetermined transmission times, the method comprising the steps of said computer processor executing at least the following steps:

a traversing said data structure, and, for each data structure element having at least one of said remote unit predetermined times;

b. waiting upon either a transmission from said remote unit associated with said data structure element or a timeout without receiving a transmission from said remote unit;

c. upon reception of said transmission from said remote unit, transmitting an acknowledgement of said received transmission and transmitting a time signal for next remote transmission, said time signal being consistent with said predetermined transmission time contained in said element, and advancing to said next time ordered data structure element and executing step b; and d. upon timeout without receiving said transmission from said remote, advancing to said next time ordered data structure element and executing step b.

28. A method as recited in claim 27, wherein said time signal includes a time delay for said remote unit to wait until transmitting.

29. A method as recited in claim 27, wherein said time signal includes an absolute time at which said remote unit is to transmit.

30. A method as recited in claim 27, wherein said time signal includes no time data which said remote unit interprets as an instruction to re-execute the current predetermined time.

31. A building monitoring system utilizing bi-directional radio frequency communication comprising:

at least one master unit including a radio frequency transmitter and receiver;

a plurality of remote units having a radio frequency transmitter and receiver and at least one sensor, said remote units capable of transmitting to and receiving from said master unit, said remote units also adapted to transmit a message including sensor data to said master unit; and said master unit includes a master scheduler that provides non-colliding predetermined remote transmission times for each of said remote units, said remote units have a timer coupled to a controller for enabling said remote units to communicate and deliver a complete message including the sensor data to the master unit during each of at least selected predetermined remote transmission times.

32. A bi-directional building monitoring system comprising:

at least one master unit including means for wireless transmission and reception of data;

a plurality of remote units, wherein each of said remote units include means for wireless transmission of data to said master unit and means for wireless reception of data from said master unit, at least selected remote units further including means for sensing external conditions and generating external sensor data;

means for calculating a schedule of transmissions from said remote units to said master unit;

wherein said means for transmitting from said master unit to said remote units includes means for transmitting at least part of said schedule to said remote units; and timing means in said remote units for enabling said remote unit to transmit said external sensor data to said master unit during each of at least selected scheduled transmissions in accordance with said schedule.

33. A building monitoring system utilizing bi-directional radio frequency communication comprising:

at least one master unit including a radio frequency transmitter and receiver;

a plurality of remote units having a radio frequency transmitter and receiver, said remote units capable of transmitting to and receiving from said master unit; and said master unit includes a master scheduler that provides non-colliding predetermined communication times for each of said remote units, said remote units have a timer coupled to a controller for enabling said remote units to communicate at said predetermined communication times with said master unit, said master unit transmitting a next predetermined communication time to each of at least selected remote units after reception during a current predetermined communication time.

34. A building monitoring system utilizing bi-directional radio frequency communication comprising:

at least one master unit including a radio frequency transmitter and receiver;

a plurality of remote units having a radio frequency transmitter and receiver, said remote units capable of transmitting to and receiving from said master unit and further having one or more sensors for sensing one or more environmental variables; and said master unit includes a master scheduler that provides non-colliding predetermined communication times for each of said remote units, said remote units have a timer coupled to a controller for enabling said remote units to communicate at said predetermined communication times with said master unit, said predetermined times provided by the master scheduler for at least selected remote units being dependent on the expected rate of change of the one or more environmental variables sensed by the one or more sensors of the selected remote units.

* * * * *